(12) United States Patent
Yamamoto et al.

(10) Patent No.: US 6,629,515 B1
(45) Date of Patent: Oct. 7, 2003

(54) ENGINE CONTROL DEVICE

(75) Inventors: Kazuhisa Yamamoto, Wako (JP); Yusuke Tatara, Wako (JP); Shigeru Aoki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/679,145

(22) Filed: Oct. 5, 2000

(30) Foreign Application Priority Data

Oct. 8, 1999 (JP) .......................................... 11-288753

(51) Int. Cl.$^7$ ................................................ F02N 11/00
(52) U.S. Cl. ................................... 123/179.4; 307/10.6
(58) Field of Search .................... 123/179.4; 307/10.6; 701/112, 113

(56) References Cited

U.S. PATENT DOCUMENTS

| 4,494,497 A | * | 1/1985 | Uchida et al. ............ 123/179.4 |
| 5,451,820 A | * | 9/1995 | Gotoh et al. ................ 307/10.6 |
| 6,192,847 B1 | * | 2/2001 | Davis ....................... 123/179.4 |

FOREIGN PATENT DOCUMENTS

| JP | 04-246252 | 2/1992 |
| JP | 7-004284 | 1/1995 |
| JP | 9-093717 | 4/1997 |
| JP | 9-163506 | 6/1997 |
| JP | 09-209790 | 12/1997 |

OTHER PUBLICATIONS

Office action dated Jul. 8, 2003 from the corresponding Japanese Patent Application No. 11–288753.

* cited by examiner

Primary Examiner—Andrew M. Dolinar
(74) Attorney, Agent, or Firm—Armstrong, Westerman & Hattori, LLP (57) ABSTRACT

An engine control device is provided, capable of restarting the engine when starting the vehicle rapidly and without giving any feeling of unease to the driver at the time of starting the vehicle by restarting the engine from the idle stop state. The engine control device comprises an engine stop determination device for determining the propriety of stopping the engine; an engine stop device for stopping the engine based on the determination of the engine stop determination device; an engine start determination device for determining the propriety of starting the engine; an engine starting device for starting the engine based on the determination of the engine start determination device; and a vehicle forward signal state detecting device for detecting the state of the traffic light directly ahead in the vehicle travelling direction; wherein said engine start determination device determines whether it is appropriate to start the engine based on the change of the traffic light state detected by said vehicle forward signal state detecting device, when the engine is stopped by the determination of said engine stop determination device while the vehicle stops during driving.

10 Claims, 6 Drawing Sheets

ENGINE CONTROL DEVICE

BACKGROUND OF THE INVENTION

Field of the Invention

The present invention relates to an engine control device, and particularly relates to an engine control device capable of restarting the engine when a traffic light changes to green while the engine is stopped, for example, waiting for the traffic light.

Background Art

The fuel consumption due to idling can be reduced by stopping the engine when the vehicle is stopped waiting for a traffic light at an intersection or stopped on a road due to the traffic congestion.

In order to reduce the fuel consumption by stopping the engine while the vehicle is stopped under these circumstances, a vehicle is developed provided with an engine control device, which stops the engine while the vehicle is stopped during travelling, and restarts the engine at the time of restarting the vehicle.

One conventional example of such an engine control device is disclosed in Japanese Unexamined Patent Application, First Application No. Hei 4-246252, which detects travelling information such as the vehicle speed, the depressed (ON)/released (OFF) state of the accelerator, etc., and stops the engine temporarily when the vehicle is stopped based on the above-mentioned travelling information, and restarts the engine when the transmission is in low gear, the clutch is applied (ON), and the accelerator is also depressed (ON).

Another example is disclosed in Japanese Unexamined Patent Application, First Application No. Hei 9-209790, in which the engine is restarted when the brake is released.

However, in conventional engine control devices, particularly in the conventional engine control devices, in which the engine is restarted when the brake is released, the following problem arises in contrast to the fact that these control devices are advantageous to the safety of the driver because these devices restart the engine after the braking is released. That is, the problem is that, since it takes time for sequential operations from releasing the brake pedal to depressing the accelerator pedal for restarting the engine, and a delay may occur in restarting the vehicle even if the driver wishes to start the vehicle immediately, which results in causing traffic congestion near the intersection.

SUMMARY OF THE INVENTION

It is therefore an objective of the present invention to provide an engine control device, capable of starting the vehicle by restarting the engine without a delay contrary to the driver's will when the vehicle is started by restarting the engine in the idle stop state.

The first aspect of the present invention provides an engine control device comprising: an engine stop determination device for determining the appropriateness of stopping the engine; an engine stop device for stopping the engine based on the determination of the engine stop determination device; an engine start determination device for determining the appropriateness of starting the engine; an engine starting device for starting the engine based on the determination of the engine start determination device; and a vehicle forward signal state detecting device for detecting the state of a traffic light directly ahead of the vehicle travelling direction; wherein said engine start determination device determines whether it is appropriate to start the engine based on the change of the traffic light state detected by said vehicle forward signal state detecting device, when the engine is stopped by the determination of said engine stop determination device while the vehicle stops during driving.

The control device constituted as described above has the effect that the vehicle can be started according to the driver's will by starting the engine, predicting the driver's will, anticipating the change of a traffic light from red to green.

According to the second aspect, in an engine control device according to the first aspect, said engine start determination device starts the engine when the state of the traffic light detected by said vehicle front signal state detecting device changes from red to green.

According to the second aspect, it is possible to prevent traffic congestion due to the time lag in starting the vehicle by starting the engine without delaying other vehicles.

According to the third aspect, in the engine control device according to the first aspect, the change of the state of the traffic light detected by said vehicle front signal state detecting device is recognized by the traffic light color recognition processing.

According to the third aspect, since the state of the traffic light can be determined by a control device similar to the human judgement carried out by sight, it is possible to start the vehicle in conformity with the driver's will without giving any feeling of unease to the driver.

DETAILED DESCRIPTION OF THE INVENTION

Figure 2:
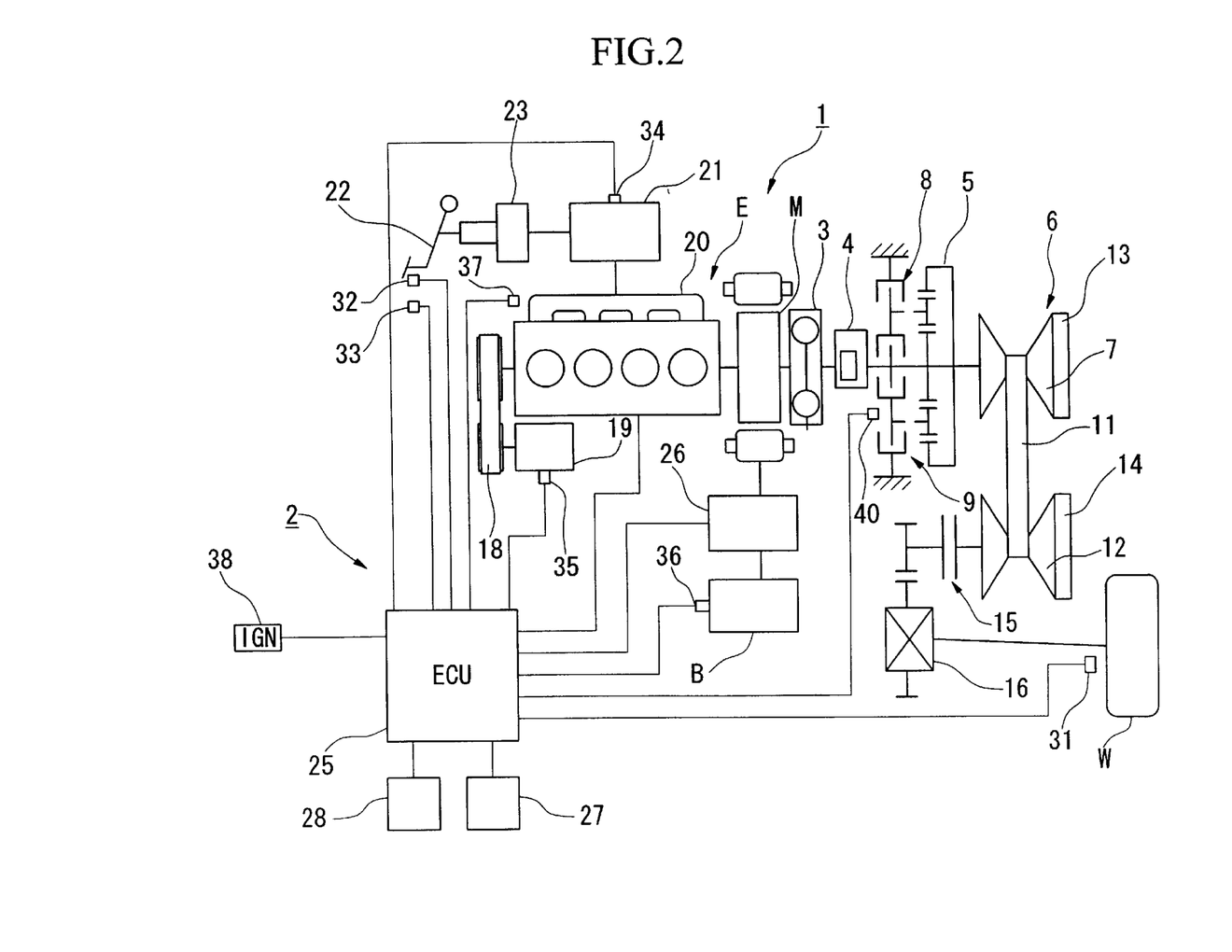
FIG. 2 is a schematic diagram showing the structure of a hybrid vehicle according the first embodiment of the present invention.

Hereinafter, the present invention will be explained using a hybrid vehicle as an example with reference to the attached drawings. FIG. 2 is a schematic diagram showing the structure of a hybrid vehicle 1.

In the embodiment shown in FIG. 2, the hybrid vehicle 1 comprises a control device 2, in which a motor generator M connected to the engine E assists the driving of the drive shaft of the engine E and the motor generator M is operated as an generator at the time of deceleration for generating a regenerative braking force by the motor generator M for charging a battery B by recovering the kinetic energy of the vehicle as electric energy. Furthermore, in the hybrid vehicle 1, since the output axis of the engine E is directly connected to the rotation axis of the motor generator M, the motor generator M can be used as a starter at the time of starting up the engine E.

In the power transmission shown in FIG. 2, the output axis of the engine E and the rotation axis of the motor generator M are constituted to drive the rotation of a dual-mass fly-wheel 3 and an oil pump 4. Furthermore, the output axis of the engine E and the rotation axis of the motor generator M are connected to the driving axis side (driving side) pulley 7 of the CVT (Continuous Variable Transmission) 6 through a forward-backward switching planetary 5. The forward-backward switching planetary 5 selectively engages friction elements 8 and 9, actuated by oil pressure, by operating the select-lever by use of the oil switch valve connected to the select-lever (not illustrated).

Thereby, the rotation directions of the engine E and the motor generator M, input into the driving-side pulley 7 of the CVT 6, are switched.

The rotation of the driving-side pulley 7 is transmitted to the driven side pulley 12 through a metal belt 11. The ratio of the rotation number of the driving side pulley 7 and that of the driven side pulley 12 is determined by the wrapping diameters of the metal belt 11 on respective pulleys, and the wrapping diameters of the metal belt are controlled by the pressing forces due to the oil pressures applied to the side chambers 13 and 14 of respective pulleys.

The oil pressure is generated by the oil pump 4 and applied to these side chambers 13 and 14. In addition, the rotation of the driven side pulley 12 is transmitted to the driving wheels W through the starting clutch 15 and the differentials 16.

The output axis of the engine E is connected to the air compressor 19 through the rotation belt 18, and the air intake tube 20 of the engine E is connected to the brake booster 23, which is connected to the brake pedal 22, through a negative pressure tank 21. The control device 2 is provided with a ECU (Electronic Control Unit) 25 comprising a microcomputer composed of a CPU, RAM, and ROM (not illustrated). The ECU 25 is connected to a fuel supply device and an ignition device (both not illustrated) of the engine E for controlling an amount of fuel supply and ignition timings.

Furthermore, the ECU 25 is connected to a power drive unit 26. Thereby, the power drive unit 26 can controls the driving of the motor generator M and the regenerative operation.

In addition, the ECU 25 is connected to a navigation device 27 so as to control the engine E referring to road-related information obtained by the navigation device 27. Road-related information includes altitude information of the road on which the hybrid vehicle 1 is travelling, lane information of the road as to which lane the hybrid vehicle 1 is travelling, and location information indicating whether the vehicle is travelling near a right or left turning point.

Various sensors are connected to the ECU 25 such as a G sensor 28, a vehicle speed sensor 31 for detecting the vehicle speed, a brake switch 32 for detecting the operation ofthe brake pedal 22, an accelerator switch 33 for detecting the operation of the accelerator pedal, a brake negative pressure tank pressure sensor 34 for detecting the internal pressure ofthe negative pressure tank 21, an air compressor switch 35 for executing the ON/OFF control of the air compressor 19, a state of charge sensor 36 for detecting the state of charge of the battery B, a water temperature sensor 37 for detecting the water temperatre of the cooling water of the engine E, an ignition switch 38, and a shift position sensor 40 for detecting whether the forward-backward switching planetary 5 is in the forward range or in the backward range.

Figure 3:
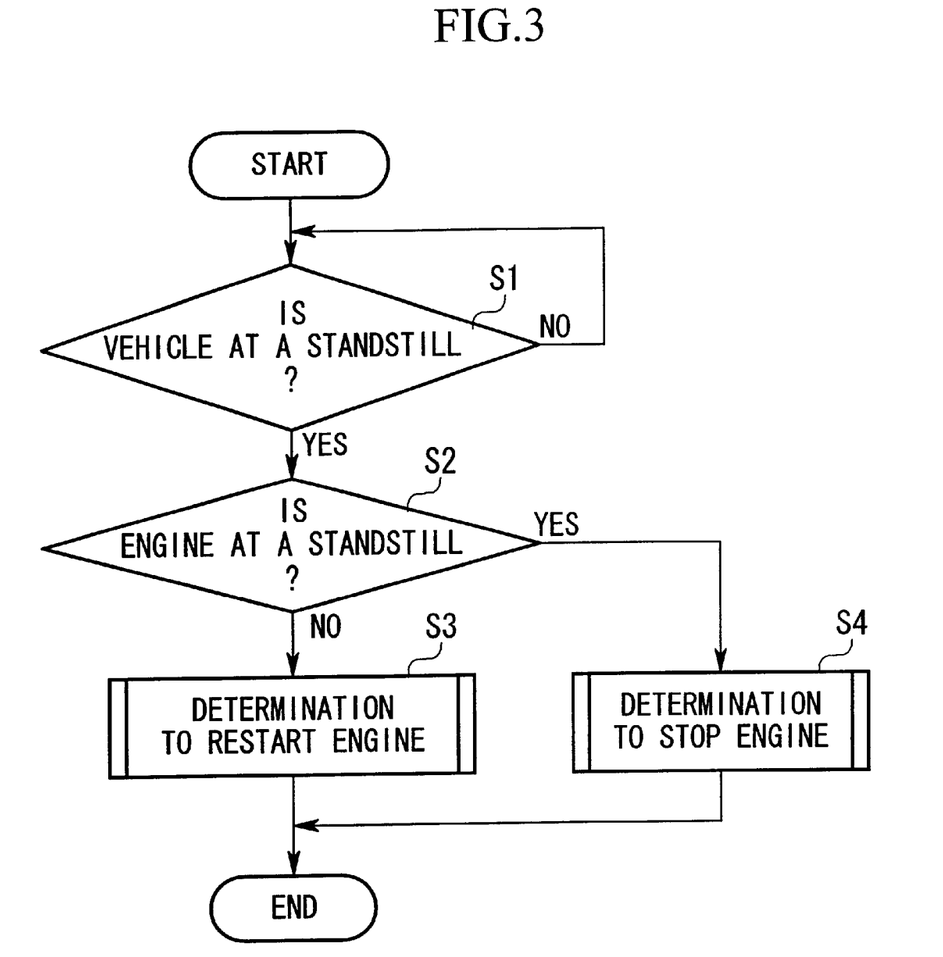
FIG. 3 is a flow-chart showing the operations of the engine stop and the determination of restarting the engine.

Step S1 in FIG. 3 determines whether the vehicle has stopped, or in other words, es at a standstill. This determination is executed by the detection of the vehicle speed sensor 31. When it is determined that the vehicle is at a standstill, the flow procmees to step S2, wherein it is determined whether the engine E has stopped. When it is determined that the vehicle is not at a standstill, determination in step S1 is repeated.

Next, a determination for stopping the engine or restarting the engine after the vehicle stops is explained with reference to the flow-chart of FIG. 3.

When it is determined in step S2 that the engine E is at a standstill, a determination is made in step S3 whether or not it is appropriate to start the engine E. This determination process is described later in detail. When it is determined in step S2 that the engine E is not at a standstill, the flow proceeds to step S4, and it is determined whether or not it is appropriate to stop the engine E. This determination process is also described later in detail.

Figure 4:
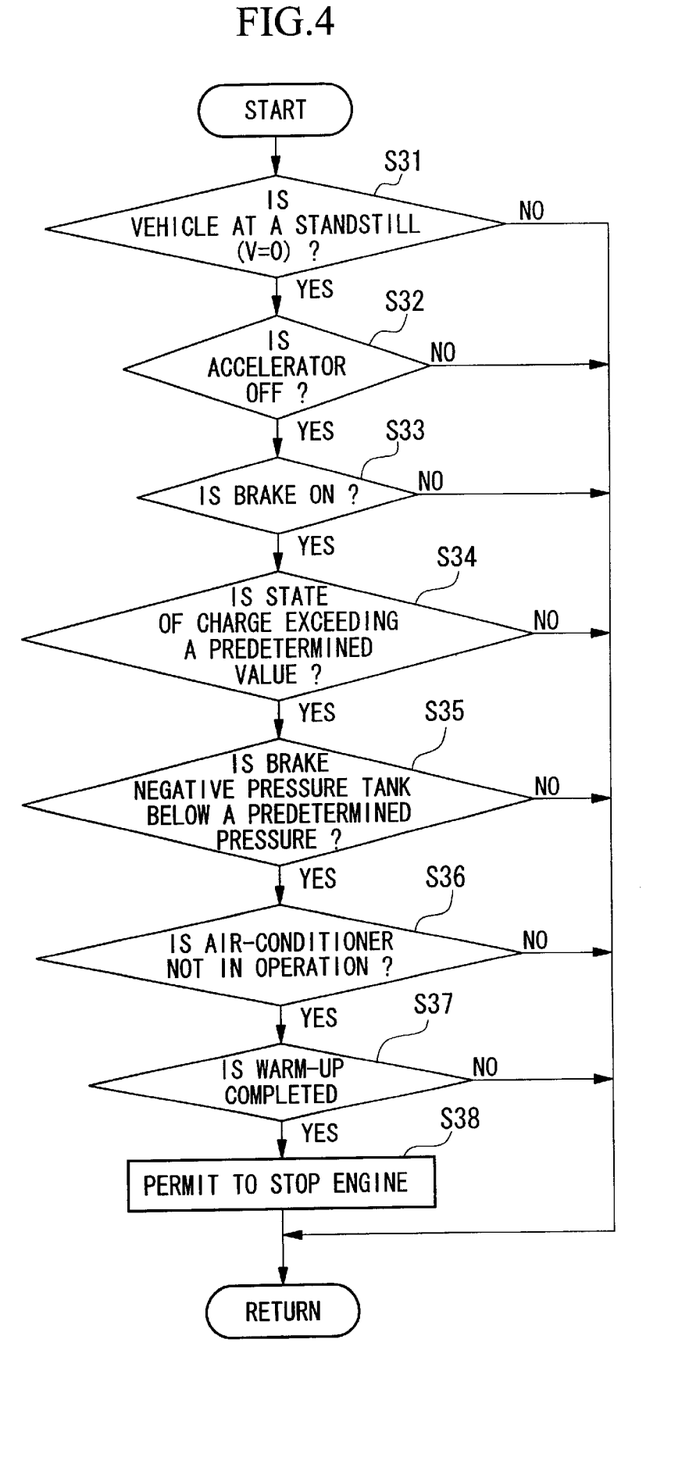
FIG. 4 is a flow-chart showing an operation to stop the engine according to the first embodiment of the present invention.

Next, determination in step S4 to stop the engine is explained with reference to the flow chart shown in FIG. 4.

Step S31 determines whether the vehicle is at a standstill, that is whether the vehicle speed V=0. This determination is made because the vehicle must be at a standstill in order to permit the engine E stop. When the result in step S31 indicates that the vehicle is at a standstill, the flow proceeds to step S32. When the result in step S31 shows that the vehicle speed V≠0, the flow returns.

In step S32, it is determined whether the accelerator is in the released state by the accelerator switch 33. This determination is made because it is necessary to confirm the driver's will, that the driver does not intend to move the vehicle in order to permit the engine stop. When the accelerator is in the released state, the flow proceeds to step S33. If the accelerator is depressed the flow proceeds to return.

In step S33, it is determined whether or not the brake is applied (ON) by the brake switch 32. This determination is made because it is necessary to confirm the driver's will that the driver intends to stop the vehicle in order to permit the engine stop. When the result in step S33 shows that the brake is applied, the flow proceeds to step S34. If the result in step S33 shows that the barke is released, then the flow returns.

In step S34, it is determined whether the state of charge of the battery (the remaining battery charge) exceeds a predetermined value. This determination is made because it is at least necessary for the battery to have a necessary and sufficient charge, since it is necessary to activate the motor generator M by the power drive unit 26 when restarting the engine E after the engine stop. Practically, the predetermined value of the state of charge of the battery B is set at, for example, 100Wh for furnishing the necessary electric power for the engine restart and for actuating various electrical accessories during the engine stop. When the state of charge of the battery B is equal to or more than the necessary level, the flow proceeds to step S35, and when the state of charge is less than the necessary level, the flow returns.

In step S35, it is determined whether or not the pressure of the negative pressure tank 21 is equal to or less than a predetermined pressure (for example, −250mmHg) based on the detected pressure of the brake negative pressure tank pressure 21. This determination is made because it is necessary to maintain the internal pressure of the negative pressure tank 21 equal to or below the predetermined pressure which guarantees safe braking, since the braking power is doubled by use of the brake booster 23 utilizing the intake pipe negative pressure. When it is determined that the internal pressure of the negative pressure tank 21 is equal to or below the predetermined pressure, the flow proceeds to step S36. When the internal pressure exceeds the predetermined pressure, the flow returns.

In step S36, it is determined whether the air conditioner is in operation based on the ON/OFF operations of the air conditioner switch 35. This determination is made because the engine should not be permitted to stop while the air conditioner is in operation, since the air conditioner 19 is rotated through the rotation belt 18 from the output axis of the engine E. When the air conditioner is not in operation, the flow proceeds to step S37. When the air conditioner is in operation, the flow returns.

In step S37, it is determined whether or not the warm-up operation of the engine E has been completed based on the detected value of the water temperature sensor 37. When the warm-up operation of the engine E is completed, the engine stop is permitted in step S38 and the flow returns.

Figure 1:
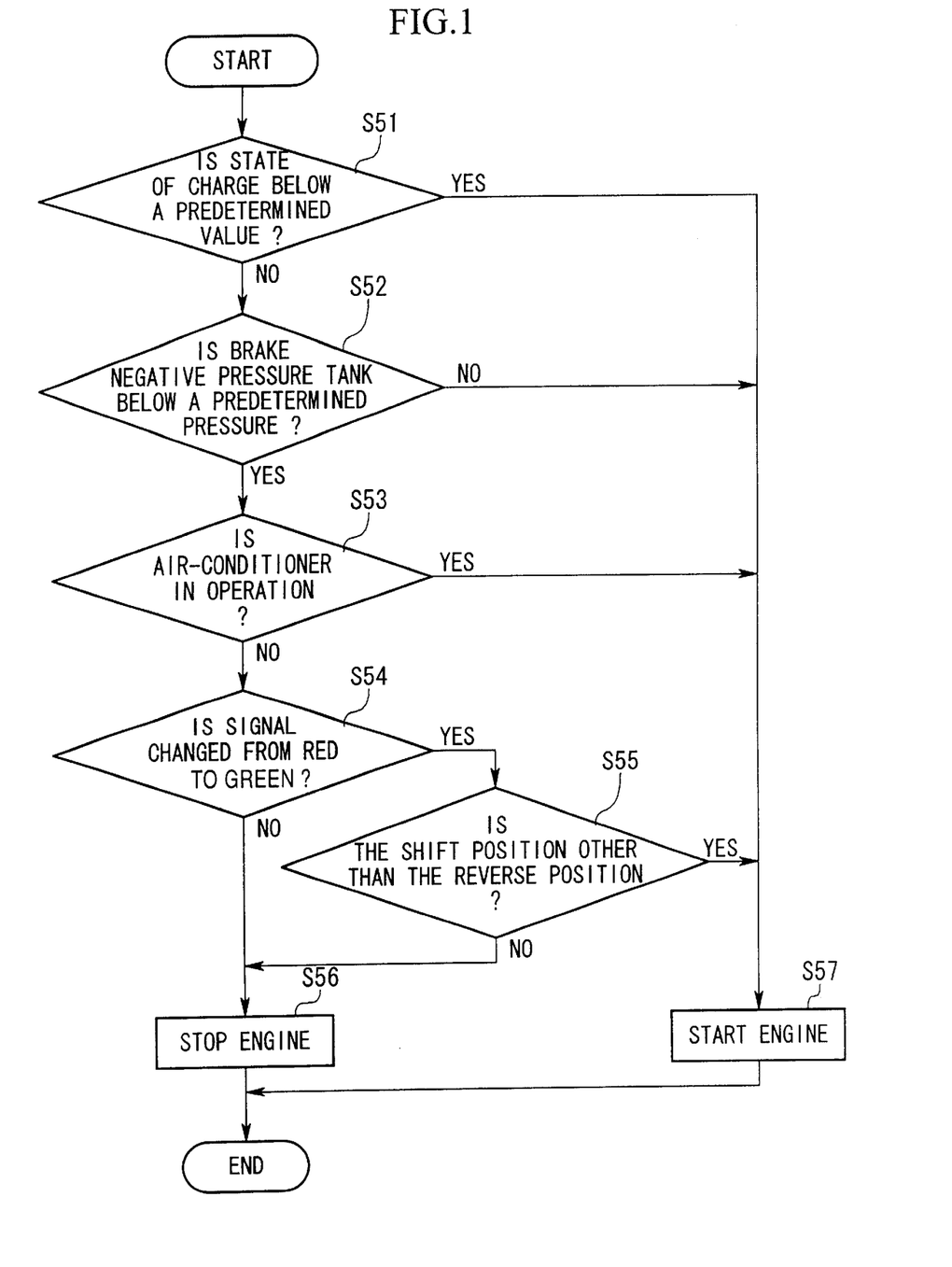
FIG. 1 is a flow-chart showing an operation to restart the engine according to the first embodiment of the present invention.

The determination of restarting the engine E in step S3 in FIG. 3 will be explained with reference to the flow-chart shown in FIG. 1.

In step S51, it is determined whether the state of charge of the battery is equal to or below the above-mentioned predetermined value based on the value obtained by the state of charge sensor 36. When the state of charge of the battery is equal to or less than the predetermined value described in step S34, the flow proceeds to step S57 and the control is completed. This step is carried out in order to increase the state of charge, when the state of charge is below the predetermined value as explained in step S34 shown in FIG. 4. If the result in step S51 indicates that the state of charge is larger than the predetermined value, the flow proceeds to step S52, and step S52 determines whether or not the internal pressure of the negative pressure tank 21 is equal to or less than the above-described predetermined value based on the detected result of the brake negative pressure tank pressure sensor 34. This step is carried out in order to preserve the brake negative pressure when the internal pressure of the negative pressure tank 21 is not below the predetermined pressure. When the pressure of the negative pressure tank is higher than a predetermined value, then the flow proceeds to step S57 in order to decrease the pressure by operating the engine E. When the pressure is below the predetermined value, the flow proceeds to step S53.

In step S53, it is determined whether the air-conditioner is in operation based on the ON/OFF state of the air-conditioner switch 35. When the air-conditioner is in operation, the flow proceeds to step S57. When it is determined that the air-conditioner is not in operation, the flow proceeds to step S54.

In step S54, it is determined whether the traffic light has changed from red to green. When it is determined that the traffic light has changed from red to green, the flow proceeds to step S55. When it is determined in step S54 that the traffic light has not changed from red to green, the engine stop continues in step S56 and the flow is completed.

In step S55, it is determined whether the shift position is in a position other than the reverse position. This determination is made for preventing the vehicle from moving in the reverse direction. When it is determined that the shift position is not the reverse position, the engine is restarted in step S57 and the flow is completed.

Figure 5:
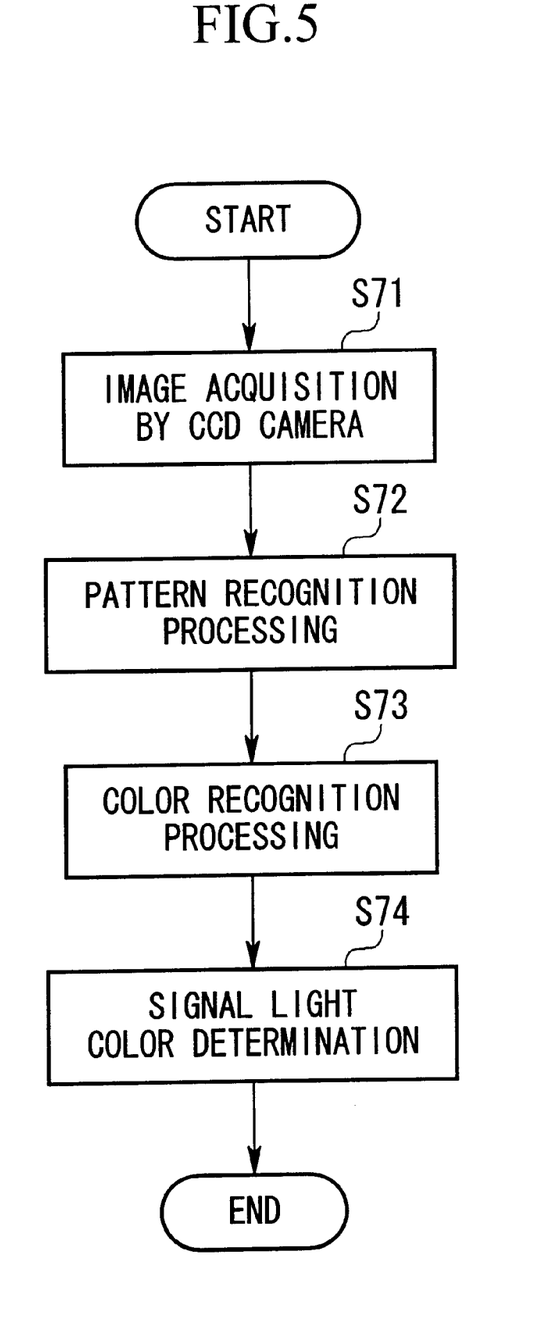
FIG. 5 is a flow-chart showing an operation to judge the color of the traffic light according to the first embodiment of the present invention.

Next, a flow chart is explained for determining the state of the traffic light with reference to FIG. 5. In step S71, an image is acquired by a CCD camera. The image acquisition is executed by acquiring an image including the signal light of the traffic light using a CCD camera installed in front of the vehicle. Next, in step S72, pattern recognition processing is carried out for recognizing the signal pattern by pattern recognition. In step S73, the color recognition processing is carried out for recognizing the color of the traffic light. In step S74, the color of the traffic light is determined and the flow is completed.

The signal state is determined, that is, it is determined whether the color of the signal light is red, green, or yellow, and this signal color has been used as the bases for the determination in step S54.

As described above, according to the present embodiment, since step S54 determines the change of the signal changes from red to green while the engine is stopped and in step S57 the engine is started if step S55 determines that the shift position is not in the reverse position, the vehicle can be started without giving the driver a feeling of unease and without delay compared to the vehicles having no engine stop function. That is, according to the present embodiment, it is possible to start the vehicle immediately without delay compared to the starting time of the vehicles having no engine stop function, because the present control device is capable of eliminating the delay of restarting the vehicle caused by time consuming conventional operations comprising releasing the brake pedal and depressing the accelerator pedal. Furthermore, it is possible for the driver to start the vehicle smoothly without a feeling of unease by eliminating sudden start occurring simultaneously with the depression of the accelerator pedal. Thus, the provision of the control device of the present invention allows the prevention of traffic congestion in the vicinity of intersections, caused by the delay of starting the vehicle having the engine stop function at the time of waiting for the traffic light.

It is noted that since the engine starts before determining the state of the traffic light in some cases such as when the state of charge of the battery is less than a predetermined value, when the pressure of the negative pressure tank is less than the predetermined value, and when the air-conditioner is in operation, the energy management can be controlled without causing any trouble.

Figure 6:
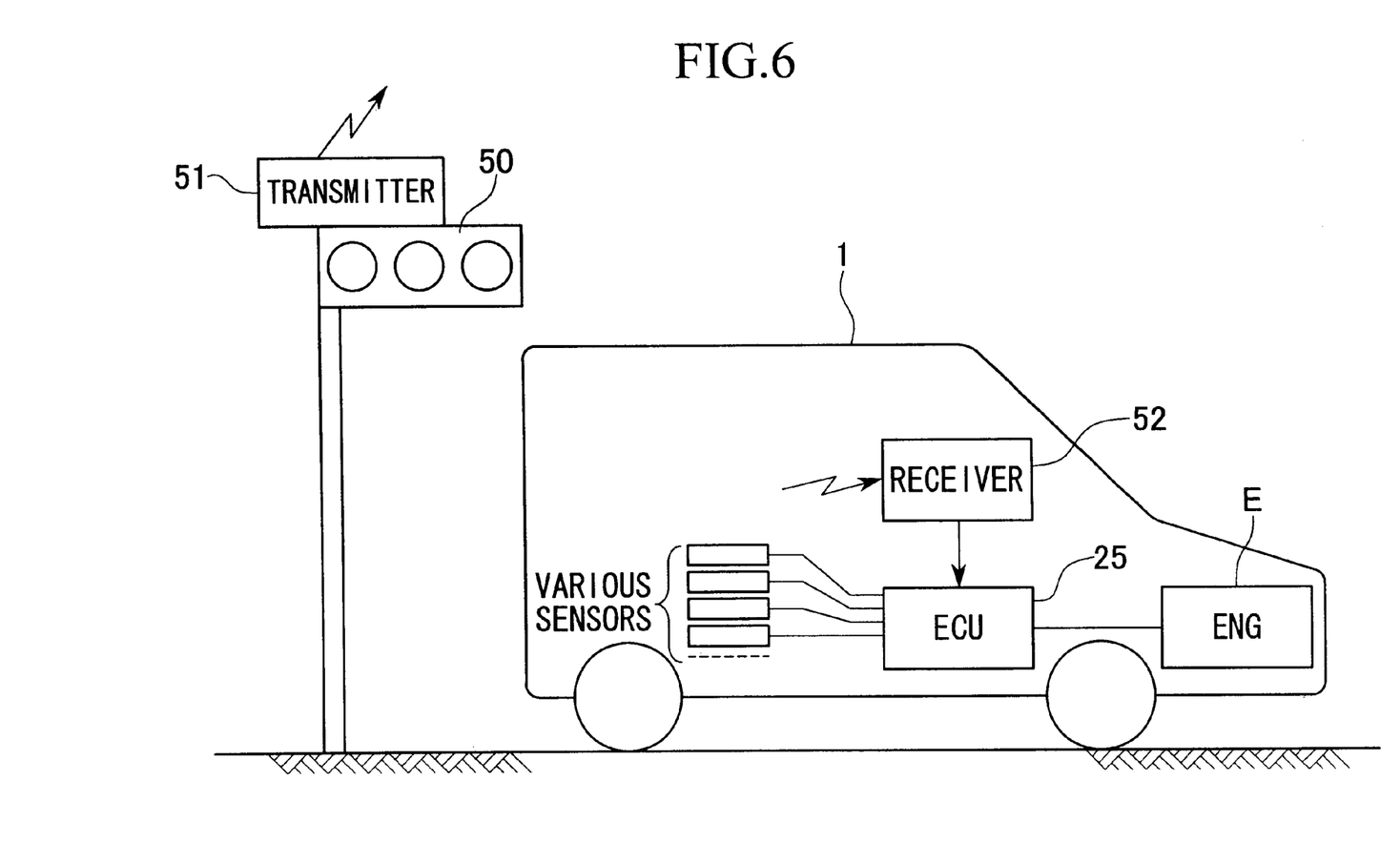
FIG. 6 is a diagram showing the main portion of the second embodiment of the present invention.

Next, the second embodiment of the present invention will be described with reference to FIG. 6. In this embodiment, the change of the signal color from red to green is detected by detecting a change of electric waves emitted by the traffic light 50 corresponding to the signal color. A transmitter 51 attached to the traffic light 50 transmits an electric wave in synchronism with the state of the signal light to a certain receiving area of the traffic light 50. The vehicle 1 comprises a receiver 52 corresponding to the transmitter 51 as shown in FIG. 6 such that the vehicle can determine the timing to start the engine by taking into account the electric wave from the transmitter 51 in the ECU 25. Thus, it is possible to select the timing to start the engine. For example, the engine E can be started immediately after the change of the signal color from red to green or the engine E can be started a little earlier before the signal changes from red to green. That is, if the electric wave is emitted before the change of the signal light from red to green, the engine E can be started a little before the traffic light changes to green. It is also possible to change the starting time of the engine E in response to the distance (presence and the number of leading vehicles) to the intersection.

Practically, the electric wave emitted by the transmitter 51 of the traffic light 50 may include, for example, information indicating the location of the traffic light 50, information showing the traffic light color, and information indicating in many seconds the change of the traffic light color will take place. In contrast, the vehicle comprises a system including a map which allows it to determine the road (including the lane) on which the vehicle is travelling by, for example, map matching. Therefore, each vehicle determines the state of the traffic light after obtaining information concerning the traffic light located ahead. It is noted that the road information may be obtained by selecting a road having the least angular difference by use of an azimuth sensor instead of the map matching.

Furthermore, it is noted that inclusion of car navigation information and blinker information of the vehicle in addition to the above-described road information indicating the condition of the road on which the own vehicle is travelling allows adopting a variety of ways for starting the engine. For example, when the traffic of the road ahead is congested, and if it is anticipated that the vehicle cannot enter into the intersection even if the signal changes from red to green, the engine is not started.

Therefore, similar to the first embodiment, since the present embodiment is capable of restarting the engine by receiving the electric wave transmitted when the traffic light changes from red to green, the driver can start the vehicle smoothly, without feeling any unease and without delay compared to vehicles having no engine stop function. That is, the control device of the present embodiment can relieve the driver from the engine, comprising a combination of the release of the brake and depressing the accelerator pedal, which results in starting the vehicle without delay compared to the other vehicles which do not stop their engines.

In addition, because the control device of the present embodiment does not carry out starting the engine suddenly, simultaneously with the depression of the accelerator pedal, the driver can start the vehicle without feeling a sense of unease.

Since the engine is started before determining the signal state in any case when the state of charge is less than the predetermined value, when the pressure of the negative pressure tank is below the predetermined value, and when the air-conditioner is in operation, the energy management will be carried out satisfactorily similar to the case of the first embodiment.

It is noted, however, that the present invention is not limited to the above embodiments and not limited to the hybrid vehicles and the present invention can also be applied to conventional vehicles using gasoline.

As described above, the effect of the control device of the first aspect is that the vehicle can be started without a delay in responding to the driver's will by starting the engine, anticipating the driver's will, anticipating the change of the traffic light from red to green.

According to the second aspect, it is possible to prevent the traffic congestion due to a time lag in starting the vehicle by starting the engine without delay compared to other vehicles.

According to the third aspect, since the state of the traffic light can be determined by a control device similar to the human visual judgdgement by the visual sensation, it is possible to start the vehicle in conformity with the driver's will without giving any feeling of unease to the driver.

What is claimed is:

1. An engine control device in a hybrid vehicle, comprising:
   an engine for propelling the hybrid vehicle;
   a motor for propelling the hybrid vehicle;
   an engine stop determination device for determining an appropriateness of stopping the engine;
   an engine stop device for stopping the engine based on a determination of the engine stop determination device,
   an engine start determination device for determining an appropriateness of starting the engine;
   an engine starting device for starting the engine based on a determination of the engine start determination device; and
   a vehicle forward signal state detecting device for detecting a state of the traffic light directly ahead in a vehicle traveling direction;
   wherein said engine start determination device determines whether it is appropriate to start the engine based on a change of the traffic light state detected by said vehicle forward signal state detecting device, when the engine is stopped by the determination of said engine stop determination device while the vehicle is temporarily stopped in compliance with a command signal of the traffic light; and
      wherein said engine start determination device determines a timing to start the engine depending on a distance between an intersection provided with the traffic light and vehicle.

2. An engine control device according to claim 1, wherein said engine start determination device starts the engine when the state of the traffic light detected by said vehicle front signal state detecting device changes from red to green.

3. An engine control device according to claim 1, wherein the change of the state of the traffic light detected by said vehicle front signal state detecting device is recognized by color recognition processing.

4. An engine control device in a hybrid vehicle according to claim 1, wherein said engine control device further comprises a car navigation system for determining a traffic condition of the road ahead of the traveling direction, and said engine start determination device determines not to start the engine when said car navigation system determines that the traffic of the road ahead is the congested.

5. An engine control device in a hybrid vehicle, comprising:
   an engine for propelling the hybrid vehicle;
   a motor for propelling the hybrid vehicle;
   an engine stop determination device for determining an appropriateness of stopping the engine;
   an engine stop device for stopping the engine based on a detennination of the engine stop determination device;
   an engine start determination device for detemining an appropriateness of starting the engine;
   an engine starting device for starting the engine based on a determination of the engine start determination device;
   a vehicle forward signal state detecting device for detecting information of a traffic light directly ahead in a vehicle traveling direction by receiving an electromagnetic wave sent by the traffic light indicating a state of the traffic light; and
   a map matching system for determining a road or a lane on which the vehicle travels;
   wherein said engine start determination device detennines a timing to start the engine based on information received by the vehicle forward signal state detecting device and the map matching system on the vehicle, when the engine is stopped by the determination of said engine stop determination device while the vehicle is temporarily stopped in compliance with a command signal of the traffic light.

6. An engine control device in a hybrid vehicle according to claim 5, wherein said engine start determination device determines a timing to start the engine depending on a distance between an intersection provided with the traffic light and the vehicle.

7. An engine control device in a hybrid vehicle according to claim 5, wherein said engine control device further comprises a car navigation system for determining a traffic condition of the road ahead of the traveling direction, and said engine start determination device determines not to start the engine when said car navigation system determines that the traffic of the road ahead is the congested.

8. An engine control device in a hybrid vehicle, comprising:

an engine for propelling the hybrid vehicle;

a motor for propelling the hybrid vehicle;

an engine stop determination device for deter an appropriateness of stopping the engine;

an engine stop device for stopping the engine based on a determination of the engine stop determination device;

an engine start determination device for determining an appropriateness of starting the engine;

an engine stating device for starting the engine based on a determination of the engine start determination device; and a vehicle forward signal state detecting device for detecting information of a trafic light directly ahead in a vehicle traveling direction by receiving an electromagnetic wave emitted by the traffic light;

an azimuth sensor for determining a road on which the vehicle travels based on the angular difference from the azimuth sensor, wherein said engine start determination device determines a timing to start the enginc based on information of the vehicle forward signal state detecting device and road information obtained based on the azimuth sensor when the engine is stopped by the determination of said engine stop determination device while the vehicle is temporarily stopped in compliance with a command signal of the traffic light.

9. An engine control device in a hybrid vehicle according to claim, wherein said engine start detemination device determines a timing to start the engine depending on a distance between an intersection provided with the traffic light and the vehicle.

10. An engine control device in a hybrid vehicle according to claim 8, wherein said engine control device further comprises a car navigation system for determining a traffic condition of the road ahead of the traveling direction, and said engine start determination device determines not to start the engine when said car navigation system determines that the traffic of the road ahead is the congested.

* * * * *